US007099842B1

(12) United States Patent
Nault et al.

(10) Patent No.: US 7,099,842 B1
(45) Date of Patent: Aug. 29, 2006

(54) ELECTRONIC COMMERCE CREDIT ORIGINATION METHOD AND SYSTEM

(75) Inventors: Brian D. Nault, Northville, MI (US); Allen L. Henderson, Farmington Hills, MI (US); James J Crossman, Farmington Hills, MI (US); Steve D. Larkin, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 479 days.

(21) Appl. No.: 09/562,206

(22) Filed: May 2, 2000

(51) Int. Cl.
 *G06Q 40/00* (2006.01)
(52) U.S. Cl. ......................................... 705/38; 705/35
(58) Field of Classification Search .................. 705/35, 705/38; 235/375
 See application file for complete search history.

(56) References Cited

U.S. PATENT DOCUMENTS

| | | | | |
|---|---|---|---|---|
| 4,736,294 A | * | 4/1988 | Gill et al. .................... | 235/379 |
| 4,774,664 A | * | 9/1988 | Campbell et al. ............. | 700/90 |
| 5,774,882 A | | 6/1998 | Keen et al. .................... | 705/38 |
| 5,774,883 A | | 6/1998 | Andersen et al. ............. | 205/24 |
| 5,797,133 A | | 8/1998 | Jones et al. .................... | 705/38 |
| 5,842,185 A | | 11/1998 | Chancey et al. .............. | 705/40 |
| 5,878,403 A | | 3/1999 | DeFrancesco et al. ........ | 705/38 |
| 5,890,137 A | | 3/1999 | Koreeda ...................... | 705/26 |
| 5,930,776 A | * | 7/1999 | Dykstra et al. ............... | 705/35 |
| 5,933,817 A | | 8/1999 | Hucal .......................... | 705/39 |
| 5,970,478 A | | 10/1999 | Walker et al. ................. | 705/35 |
| 6,041,310 A | * | 3/2000 | Green et al. ................... | 705/1 |
| 6,067,525 A | * | 5/2000 | Johnson et al. ............... | 705/10 |
| 6,208,979 B1 | * | 3/2001 | Sinclair ........................ | 705/1 |

* cited by examiner

*Primary Examiner*—Alain L. Bashore
(74) *Attorney, Agent, or Firm*—Gary A. Smith

(57) ABSTRACT

A credit origination system and method are provided. The inventive method includes the step (22) of receiving an application for credit from a customer to purchase a product. The application may include a first set of information designed to evaluate the creditworthiness of the customer. The method also includes the step (24) of processing the credit application. The processing step (24) may include substeps (26, 28, 30, 32) designed to verify and evaluate information provided by the customer and to obtain additional information from the customer. The method also includes the step (34) of communicating a second set of information to the customer. This information may include a decision on the application for credit and the terms of any credit to be extended. The method may also include the step (36) of communicating a third set of information to a dealer of the product. The third set of information may include the first and second sets of information. Finally, the method includes the step (42) wherein the lender assumes one or more obligations corresponding to credit issued under a contract to purchase the product entered into between the customer and dealer. The steps of the inventive method may be carried out over a pair of telecommunication networks (12, 18).

12 Claims, 2 Drawing Sheets

ELECTRONIC COMMERCE CREDIT ORIGINATION METHOD AND SYSTEM

FIELD OF THE INVENTION

This invention relates to product purchase financing and, in particular, to a method and system for credit origination designed to meet customer expectations regarding consumer lending, increase the efficiency of the credit decisioning process, and lessen the risk to the lender of extending credit.

BACKGROUND OF THE INVENTION

Several well-known methods of credit origination exist for use in financing the purchase a product such as a motor vehicle. In one conventional credit origination method, a customer for a product approaches a dealer of the product and submits an application for credit to the dealer (third party). The dealer then presents the credit application to a lender and represents the customer before the lender. The decision by the lender whether or not to extend credit to the customer, along with the terms of any credit that is extended, are then provided to the dealer who may adjust the terms to provide its own markup to the extent allowed under applicable laws. Finally, the dealer communicates the credit decision and terms to the customer and the dealer and customer enter into contracts for the purchase and financing of the product. Implementing this conventional credit origination method in an electronic environment (e.g., over a computer network such as the internet) has several drawbacks. First, the method is inefficient. If the lender needs to obtain more information from the customer in order to make a credit decision, the lender would go through the dealer. As a result, processing of credit applications is delayed and the lender is often unable to obtain sufficient customer information to make an appropriate spread of credit decisions. Second, this conventional method fails to recognize consumer expectations regarding an electronic-based financing process, including timeliness and the receipt of information with respect to the credit decision and terms.

In another conventional credit origination method, a customer for a product approaches the lender directly and submits an application for credit to the lender. The lender processes the credit application and the decision by the lender whether or not to extend credit to the customer is communicated to both the customer and a dealer of the product. The terms of any credit are also communicated to the dealer who may adjust the terms to provide its own markup to the extent allowed under applicable laws. The terms are not communicated by the lender to the customer, however. The dealer communicates the terms of the credit to the customer and the dealer and the customer enter into a contract for purchase of the product. This credit origination method also has drawbacks. As in the first method discussed hereinabove, this method fails to recognize consumer expectations regarding the financing process—in particular, the receipt of information with respect to the credit decision and terms. The customer is forced to visit a third-party, the dealer, prior to obtaining any information as to the potential terms of any credit that may be extended to finance the customer's purchase.

In yet another conventional credit origination method, a customer again approaches a lender directly and submits an application for credit. The lender processes the credit application and communicates a decision whether or not to extend credit to the customer along with the terms of any such credit. The customer enters into an agreement regarding the terms of credit with the lender and then presents the agreement to a product dealer who fulfills the purchase. Although overcoming some of the drawbacks encountered in other conventional credit origination methods, this method has its own deficiencies. In particular, because an agreement is reached before the customer visits the dealer, the lender loses an important vehicle for verifying certain information provided by the customer and has increased risk. Further, because the dealer is uninvolved in establishing the terms of the credit (i.e., is unable to introduce a markup on either the product or the financing), the dealer no longer has an economic interest in the transaction. As a result, the dealer may refer the customer to another source of financing.

There is thus a need for a method and system of credit origination that will minimize or eliminate one or more of the above-mentioned deficiencies.

SUMMARY OF THE INVENTION

The present invention provides a credit origination method and a system for consumers to finance the purchase of a product such as a motor vehicle.

A method in accordance with the present invention includes the step of receiving an application for credit directly from a customer (e.g., via the internet or another telecommunications means) to finance the purchase of a product. The application may include a first set of information characteristics designed to allow a lender to make an initial evaluation of the customer's creditworthiness. The method also includes the step of processing the application for credit. The processing step may include the step of requesting, and receiving, additional information from the customer to establish the customer's creditworthiness. The method further includes the step of communicating a second set of information to the customer. The second set of information includes a decision on the application for credit and the terms of any credit to be extended to the customer. The method may also include the step of communicating a third set of information to the dealer including the credit decision, terms, and any information provided by the customer. Finally, the method includes the step of assuming one or more obligations corresponding to credit issued to the customer under a contract to purchase the product entered into between the dealer and the customer.

A system in accordance with the present invention includes means, such as a network of computers operating under the control of a set of programming instructions (i.e., software), for receiving an application for credit from a customer to purchase a product. The system also includes means, such as a computer operating under the control of another set of programming instructions designed to implement a credit scoring algorithm, for processing the application for credit. The system further includes means, such as the above-mentioned computer network, for communicating a second set of information to the customer. The second set of information may include a decision on the application for credit and the terms of any credit to be extended to the customer. Finally, the system may include means, such as a second network of computers, for communicating a third set of information to a dealer of the product. The third set of information may include a maximum amount of credit that may be extended to the customer.

A credit origination method and system in accordance with the present invention represent a significant improvement as compared to conventional credit origination methods. First, the inventive method and system are more efficient than conventional methods because the dealer does not act as an intermediary between the customer and lender for the flow of information. Second, the inventive method and system recognize consumer expectations regarding the financing process, including prompt credit decisions and the provision of information to the customer regarding the credit decision and terms. Third, because the dealer enters into the agreement with the customer, the inventive method and system enable the dealer to verify certain information provided by the customer for the lender thereby reducing the risk to the lender. Finally, because the dealer enters into the agreement with the customer, the inventive method and system enable the dealer to incorporate a markup—at least with respect to the product—and thereby maintain an economic interest in the transaction.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
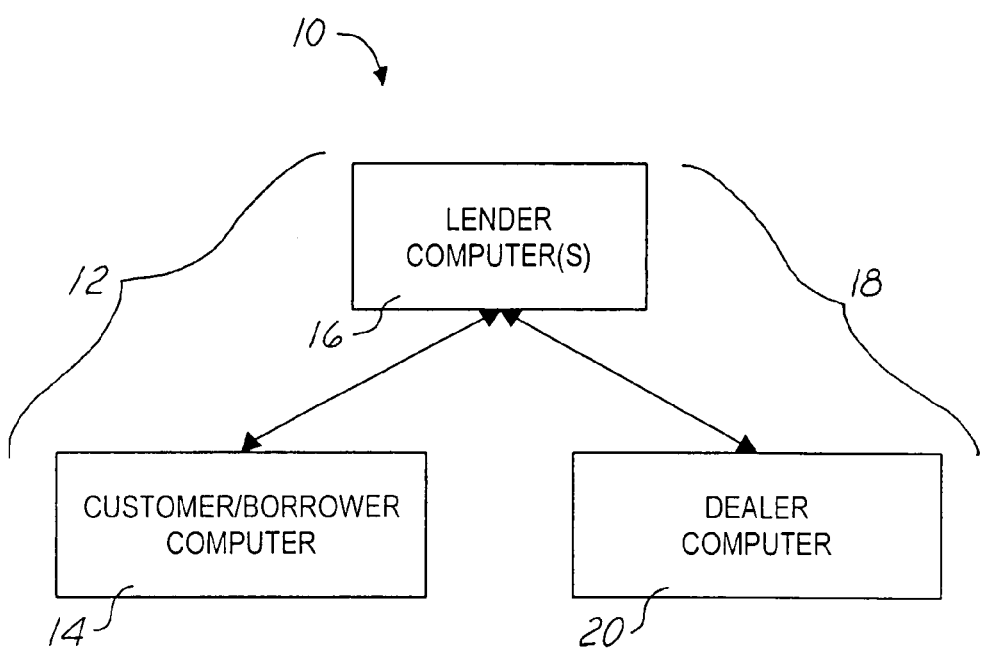
FIG. 1 is a block diagram illustrating a credit origination system in accordance with the present invention.

Referring now to the drawings wherein like reference numerals are used to identify identical components in the various views, FIG. 1 illustrates a system 10 for credit origination in accordance with the present invention. System 10 may include means, such as a network 12 of computers 14, 16 operating under the control of a set of programming instructions (i.e., software) for receiving an application for credit from a customer for the purchase of a product. System 10 may also include means, such as computer 16 operating under the control of a set of programming instructions implementing a credit scoring algorithm, for processing the credit application. System 10 may also include means, such as network 12 operating under the control of another set of programming instructions, for communicating a set of information to the customer regarding a decision on the credit application and the terms of any credit to be extended to the customer. Finally, system 10 may also include means, such as a network 18 of computers 16, 20 operating under the control of another set of programming instructions, for communicating another set of information to a dealer of a product.

Network 12 is provided to allow the exchange of information between a customer applying for credit (to purchase a product) and a prospective lender who may finance the customer's purchase of the product through a third party. In addition to providing a means for receiving the customer's credit application and communicating information to the customer regarding a credit decision and credit terms, network may also provide a means for requesting, and receiving, additional information from the customer. This additional information may be used to further evaluate the customer's creditworthiness if the initial information provided in the credit application is insufficient for the lender to render a credit decision. Network 12 is conventional in the art and may include a pair of computers 14, 16. It should be understood, however, that other conventional telecommunications networks may be used to receive the customer's credit application and to communicate information between the customer and lender.

Computer 14 may comprise a personal computer operating under the control of a conventional software "browser" such as the software program marketed under the trademark "Internet Explorer" by Microsoft Corp. Computer 16 may comprise a conventional server operating under the control of a set of programming instructions that presents a graphical user interface to the customer through the customers' browser as well as a means of transmitting, receiving and storing information exchanged between the customer and lender. Computer 16 may also provide a means for processing the customer's credit application. In particular, computer 16 may operate under a set of programming instructions designed to implement a credit scoring algorithm through which the credit application submitted by the customer is evaluated to determined the customer's creditworthiness.

Network 18 is provided to allow the exchange of information between the lender and a dealer of the product sought to be purchased by the customer. In particular, network 18 provides a means for communicating information to the dealer regarding a credit decision and the terms of any credit to be extended to the customer. The information may also include the customer's credit application and any other information provided by the customer to the lender via network 12. Network 18 is conventional in the art and may include a pair of computers 16, 20. It should again be understood, however, that other conventional telecommunications networks may be used to communicate information between the lender and the dealer. Further, although networks 12, 18 are both illustrated as including computer 16 of the lender, it should be understood that separate computers of the lender may be used in each network 12, 18. The lender's computers may, however, form another network to allow the exchange of information between the lender's computers.

Like computer 14, computer 20 may comprise a personal computer operating under the control of a conventional software "browser" such as the software program marketed under the trademark "Internet Explorer" by Microsoft Corp. Computer 20 may alternatively operate under the control of a legacy software program if network 18 is designed to operate as a private network (i.e., as opposed to forming part of the global communications network known as the Internet). As set forth hereinabove, computer 16 may comprise a conventional server operating under the control of a set of programming instructions that presents a graphical user interface to the dealer through the dealer's browser as well as a means of transmitting, receiving and storing information exchanged between the customer and dealer.

Figure 2:
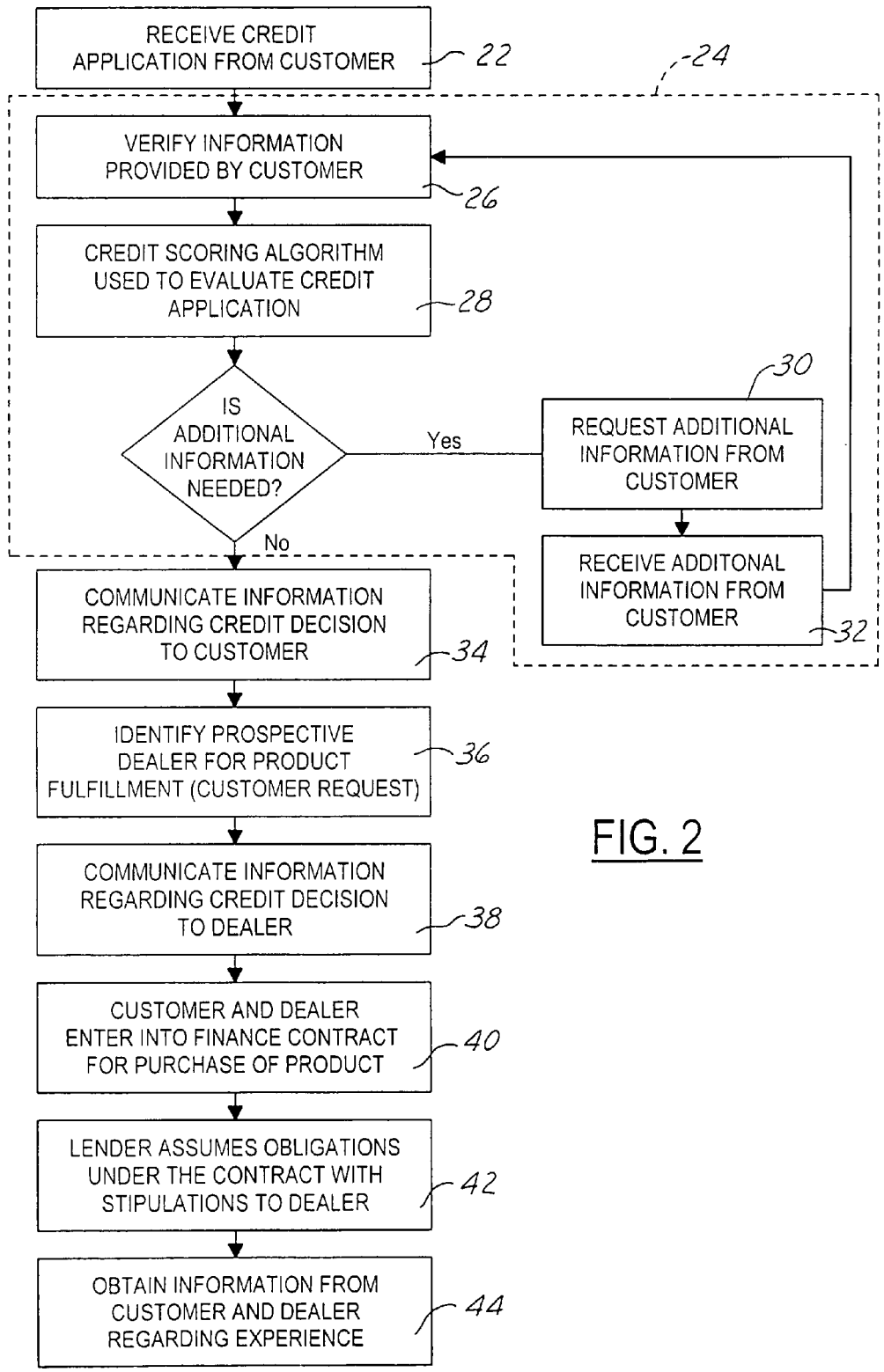
FIG. 2 is a flow chart diagram illustrating a method of credit origination in accordance with the present invention.

Referring now to FIG. 2, a credit origination method in accordance with the present invention will be described. Method may include the step 22 of receiving an application for credit from a customer to finance the customer's purchase of a product. The product may comprise a motor vehicle. It should be understood, however, that the term "product" as used throughout this specification and in the claims may refer to any of a wide variety of commercial goods and services. The credit application may include a first set of information designed to enable the lender to make an initial evaluation of the customer's creditworthiness.

A method in accordance with the present invention may also include the step 24 of processing the credit application submitted by the customer. Step 24 may include the substep 26 of verifying information provided by the customer. Substep 26 may be performed in a number of ways including by use of information provided by any of several commercially known credit verification companies. As set forth hereinabove, processing step 22 may also include the substep 28 of scoring the credit application using a predetermined credit scoring algorithm. Substep 28 may be implemented by computer 16 operating under the control of programming instructions designed to implement the credit scoring algorithm. Step 22 may also include the substeps 30, 32 of requesting, and receiving, additional information from the customer if the information submitted in the credit application is not sufficient to establish the customer's creditworthiness. The information may include the identify of a dealer from whom the customer proposes to purchase the product and the identify of a particular model of the product that the customer proposes to purchase.

One advantage of a system and method in accordance with the present invention is the ability to identify the dealer and product model only when needed. In many conventional credit origination methods, the dealer and product model either must be selected by the customer before a credit decision is made, thereby limiting the customer's options and the efficiency of the purchasing process, or one or more of the dealer and product model are never selected during the credit decisioning process, thereby increasing the risk to the lender. The inventive system and method allows those customers having a predetermined level of creditworthiness to avoid identifying the dealer and product model. For those customers who do not meet the predetermined level of creditworthiness, the inventive method and system may be used to identify the dealer and product model, thereby enabling the lender to more carefully evaluate the creditworthiness of the customer and to tailor the conditions of any extension of credit in an appropriate manner.

A method in accordance with the present invention may also include the step 34 of communicating information to the customer including a credit decision and the terms of any credit to be extended to the customer. The information may include, for example, the credit rate, the repayment term, the amount of credit, and any conditions attached to the extension of credit. As set forth hereinabove, the information may be provided to the customer over network 12. Because the dealer does not act as an intermediary providing information between the customer and the lender, the inventive method has significant advantages over many conventional credit origination methods. In particular, the inventive method is more efficient—resulting in customer friendly, faster processing of credit application and quicker credit decisions. The inventive method also recognizes consumer expectations regarding the financing process, including prompt credit decisions and the provision of information to the customer regarding the credit decision and terms. Finally, the lender is able to easily obtain additional information from the customer thereby lessening the overall risk to the lender and enabling the lender to purchase a wide spread of credit risk.

A method in accordance with the present invention may also include the step 36 of identifying a dealer of the product. In particular, once a credit decision has been made and communicated to the customer, the customer may be requested to identify a dealer to whom the credit information may also be provided. The customer may select the dealer and communicate the selection to the lender using network 12.

The inventive method may further include the step 38 of communicating information to a dealer of the product. The information may include any of the information previously provided to the customer including, for example, the credit decision, credit rate, repayment period, credit amount, and any conditions attached to the extension of credit. Alternatively, for those customers having a predetermined level of creditworthiness, the information may simply include a maximum amount for which the customer is approved and any conditions attached to the extension of credit. The information may also include any information provided by the customer to the lender including the credit application and the identity of a product model to be purchased. As set forth hereinabove, the information may be communicated to dealer over network 18.

Once information has been communicated to the customer and a dealer regarding any credit to be extended, the customer and dealer may engage in negotiations for the purchase of a product as illustrated in step 40. If these negotiations are successful, the customer and dealer will enter into contracts for the purchase of the product and the financing of the customer's purchase.

A method in accordance with the present invention may further include the step 42 wherein the lender assumes one or more obligations corresponding to the extension of credit to the customer as set forth in the contract entered into between the customer and the dealer. The lender and dealer may have a predetermined agreement as to the lender's obligations or may negotiate an individual agreement depending upon each product purchase. Because the dealer enters into the agreement with the customer and the lender merely assumes certain obligations of the agreement, the inventive method and system offer significant advantages over several of the conventional credit origination methods. First, the dealer is able to verify certain information provided by the customer to the lender on the lender's behalf, thereby reducing the risk to the lender. Second, the dealer is able to incorporate a markup—at least with respect to the product—and thereby maintains an economic interest in the transaction. As a result, the dealer will be even more committed to providing a high level of service to the customer, thereby encouraging future product sales by the dealer and financing by the lender.

Finally, a method in accordance with the present invention may include the step 44 of obtaining information from the customer and dealer regarding the financing and purchasing process. This information may be used to gauge consumer and dealer satisfaction with the process in order to refine and improve the process.

We claim:

1. A method of credit origination, comprising the steps of:

receiving an application for credit from a customer to purchase a product sold by a dealer, said application including a first set of information and said application received by a lender, but not by said dealer, said application transmitted over a computer network from a first computer of said customer to a second computer of said lender;

processing said application for credit;

communicating a second set of information from said lender directly to said customer over said computer network, said second set of information including a decision on said application for credit and a set of terms of any credit to be extended to said customer;

assuming one or more obligations corresponding to credit issued under a contract to purchase said product entered into between said customer and said dealer of said product.

2. The method of claim 1 wherein said processing step includes the substeps of:

requesting a third set of information from said customer; and, receiving said third set of information from said customer.

3. The method of claim 2 wherein said third set of information includes an identity of said dealer of said product.

4. The method of claim 2 wherein said third set of information includes an identity of a model of said product.

5. The method of claim 1 wherein said processing step includes a substep of scoring said application for credit using a predetermined credit scoring algorithm.

6. A method of credit origination, comprising the steps of:

receiving an application for credit from a customer to purchase a product sold by a dealer, said application including a first set of information and said application received by a lender, but not by said dealer, said application transmitted over a computer network from a first computer of said customer to a second computer of said lender;

processing said application for credit;

communicating a second set of information from said lender directly to said customer over said computer network, said second set of information including a decision on said application for credit and a set of terms of any credit to be extended to said customer;

communicating a third set of information to said dealer of said product; and, assuming one or more obligations corresponding to credit issued under a contract to purchase said product entered into between said customer and said dealer.

7. The method of claim 6 wherein said processing step includes the substeps of:

requesting a fourth set of information from said customer; and, receiving said fourth set of information from said customer.

8. The method of claim 7 wherein said fourth set of information includes an identity of said dealer of said product.

9. The method of claim 7 wherein said fourth set of information includes an identity of a model of said product.

10. The method of claim 6 wherein said processing step includes a substep of scoring said application for credit using a predetermined credit scoring algorithm.

11. The method of claim 6 wherein said third set of information includes said first set of information.

12. The method of claim 6 wherein said dealer is selected by said customer.

\* \* \* \* \*